United States Patent

Moyer

[11] 4,071,286
[45] Jan. 31, 1978

[54] SLIDE STORING APPARATUS

[76] Inventor: John W. Moyer, 2342 Jackson St., Fremont, Calif. 94538

[21] Appl. No.: 747,503

[22] Filed: Dec. 6, 1976

[51] Int. Cl.² ............................................. A47B 88/00
[52] U.S. Cl. ............................... 312/330 R; 206/445; 206/455; 312/345
[58] Field of Search ............... 312/330, 345; 206/44 R, 206/28 R, 42 R, 455 R, 431

[56] References Cited

U.S. PATENT DOCUMENTS

| 188,588 | 3/1877 | Chamberlain | 312/330 X |
|---|---|---|---|
| 633,318 | 9/1899 | Horle | 312/330 X |
| 1,329,139 | 1/1920 | Parker | 312/330 X |
| 1,809,781 | 6/1931 | Gross | 312/330 X |
| 2,202,047 | 5/1940 | Ehrlich et al. | 312/330 X |
| 2,482,174 | 9/1949 | Hake | 312/330 |
| 2,541,173 | 2/1951 | Moore | 312/330 |
| 2,851,188 | 9/1958 | Pavelle | 206/445 X |
| 3,400,809 | 9/1968 | Puente | 206/455 |
| 3,877,766 | 4/1975 | Seebold | 206/455 X |
| 4,011,943 | 3/1977 | Galli et al. | 206/44 R |

*Primary Examiner*—Robert L. Wolfe
*Assistant Examiner*—Victor N. Sakran
*Attorney, Agent, or Firm*—Owen, Wickersham & Erickson

[57] ABSTRACT

A tray type storage system for photographic slides is disclosed. The system includes an elongated tray having a bottom and low side walls, and a series of U-shaped storage units, each for holding a stack of slides oriented vertically. Each storage unit consists of a bottom and front and back walls, and the height and spacing of the walls is such that a single slide in the storage unit cannot fall flat to the bottom of the unit, but will lie diagonally between the bottom of one wall and the top of the other wall, avoiding difficulty in retrieving the slide from the unit. The series of storage units are retained in longitudinal succession in the tray member by small front and back flanges extending up from the bottom of the tray member. A rectangular cardboard sleeve may be provided for any or all of the individual storage units to act as a dust cover for the bundle of slides, and the enclosed unit will be accommodated by the tray member. An elongated box may be provided for the tray member and its contents.

5 Claims, 5 Drawing Figures

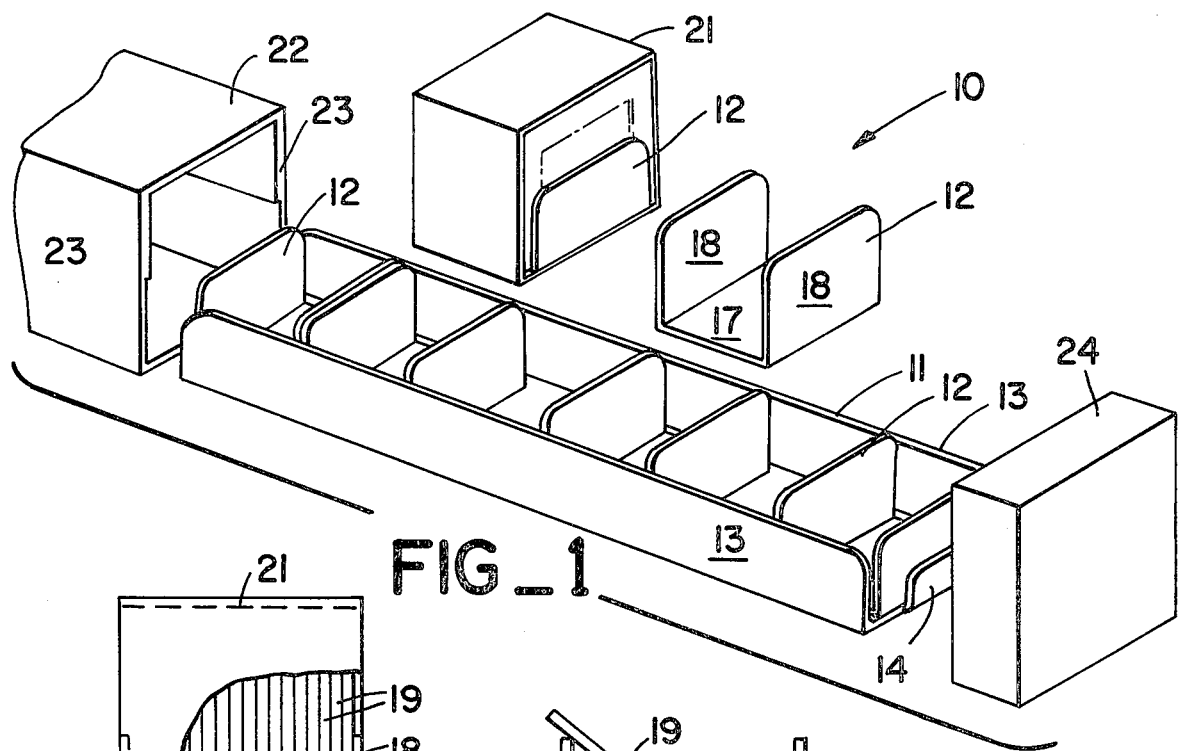
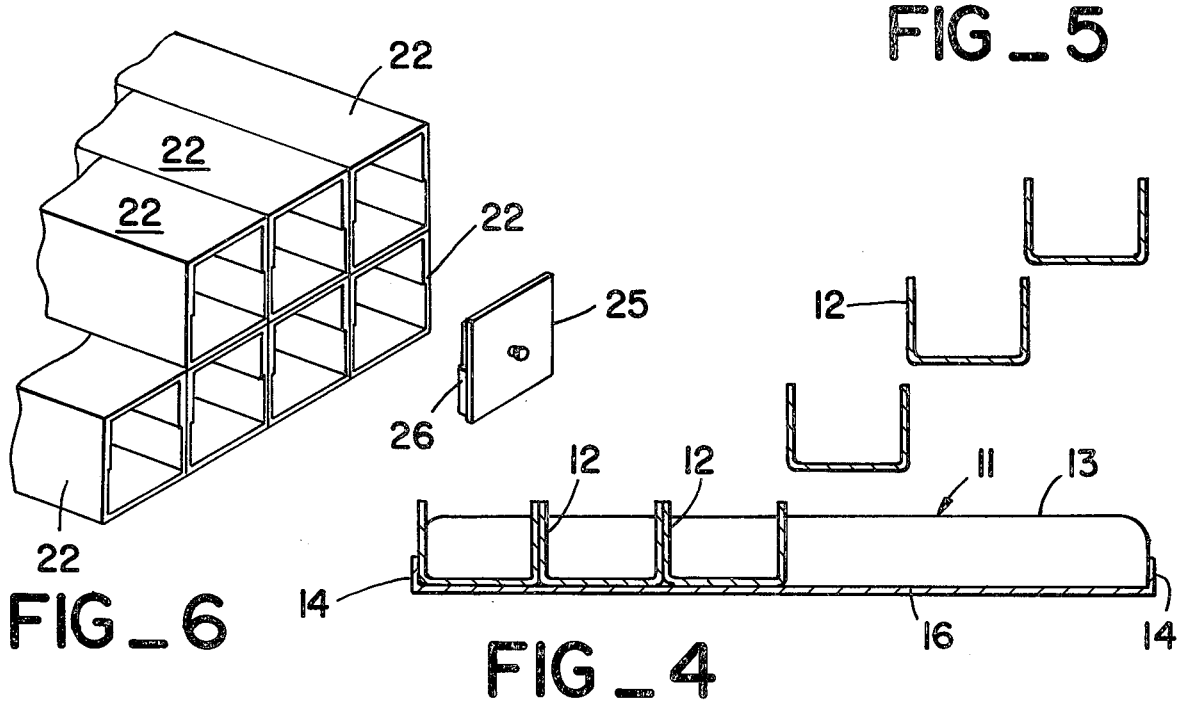

SLIDE STORING APPARATUS

BACKGROUND OF THE INVENTION

The invention relates to storage apparatus, and more particularly to a photographic slide storage system.

Various slide storage arrangements have been suggested. Many of them involve a box or case of slightly greater height then the height of a slide, with internal structure for maintaining the slides in parallel arrangement individually or in small large clusters within the case. Other storage devices include elongated box-like "magazines" for linear-fed slide projectors, where each slide is retained individually in a separate groove. While these and other slide storing devices have been effective for various purposes, there has been a need for a system which is relatively simple but is capable of providing effective dust protection and which is versatile in permitting easy assortment, withdrawl, and rearrangement of stacks of slides, as well as in permitting the assembly of a small or large number of storage modules in a compact group.

SUMMARY OF THE INVENTION

The present invention is unique in providing such an effective and versatile slide storing system. The system is flexible and interchangeable in many ways. Any number of slides can be accommodated, in individualized and easily movable clusters, and the capacity of the systems can be increased whenever desired, with modular-type units clustered together in vertical columns, horizontal rows, or combinations of rows and columns.

The system includes elongated tray members, each of which has a bottom and a pair of low upright sides. Into each tray member is placed a series of U-shaped slide storage units in longitudinal succession. Each holds a stack of slides oriented to face the end of the tray member, and each unit of slides is easily removed from the tray member without disturbing the remaining slides retained therein. Thus, the units may be rearranged or replaced easily. The tray member may be of any length, and it preferably includes front and back flanges or ends extending up from the bottom for retaining the series of storage units therein.

Each U-shaped storage unit is shorter in height than a slide, and its length is such that a single slide remaining in the unit cannot fall below the top of the walls, so that retrieval is never made difficult.

An elongated rectangular box may be provided for the tray member and its contents, for convenient storage and thorough dust protection. Similarly, there may be provided a rectangular sleeve, open at front and back, to fit over each storage unit full of slides. This gives added dust protection, helps maintain the group of slides in a unitary package when removed from the tray member, and provides a place for a written indication of the contents of that particular group of slides.

The box-like containers for the tray members may be stacked vertically or arranged horizontally, and may be assembled together to fit into a drawer or other storage space of a wide variety of dimensions. In fact, an assemblage of these boxes may be made in a continuous honeycomb-type structure, with common walls between the boxes.

Accordingly, it is among the objects of the invention to provide a slide storing system which is relatively simple and inexpensive to manufacture, while also being highly convenient and versatile in use and in storage, with an adjustable total slide capacity. These and other objects, advantages, and features of the invention will be apparent from the following detailed description of a preferred embodiment, taken in conjunction with the accompanying drawings.

DESCRIPTION OF THE DRAWINGS

FIG. 1 is an exploded perspective view showing the apparatus of the invention;

FIG. 2 is a side view of a U-shaped slide storing unit with a single slide resting therein;

FIG. 3 is a partially broken away side elevation view of the storage unit of FIG. 2, holding a full complement of slides, and with a cover sleeve positioned over the unit and the slides;

FIG. 4 is a partially sectioned, exploded side elevation view of a tray member and a series of U-shaped storage units being positioned therein;

FIG. 5 is an end view of a single retaining box for the apparatus; and

FIG. 6 is a perspective view showing a series of retaining boxes assembled together.

DESCRIPTION OF THE PREFERRED EMBODIMENT

In the drawings, FIG. 1 shows components of a slide storing system 10, including an elongated tray member 11 and a series of U-shaped storage units 12 designed to be arranged in end-to-end succession within the tray member 11. The tray member includes low side walls 13, preferably about half the height of a slide, and some form of stop at its front and back ends. The stops may be end walls or, as illustrated in FIGS. 1 and 4, merely short flanges 14 extending up from a bottom 16 of the tray member. The tray member 11 may be of any length, adapted to receive an integral number of slide storage units 12.

FIGS. 1 and 2 show the shape and relative size of the U-shaped slide storage units 12. Each has a bottom 17 and front and back end walls 18, which are somewhat higher than the tray member walls 13 but preferably much lower than the height of a slide. An important feature of these units is illustrated in FIG. 2. The diagonal distance between the top of either wall 18 and the inside corner 18a at the bottom of the opposite wall is less than the height of a slide 19, so that a slide left alone in the unit 12 cannot fall down into the unit. The top of the slide always remains above the tops of the walls 18, as shown in FIG. 2, so that the slide can always be easily retrieved or realigned vertically so that other slides can be returned to the unit.

As shown in FIGS. 1 and 4, the slide storage units 12 are arranged in tandem fashion in the tray member 11, with end walls 18 of the units adjacent to one another. Thus, at each unit four walls are established for retaining a packet of slides oriented to face longitudinally in the tray member 11. The units may be separately removed from the tray member without disturbing the remaining units, as shown in FIG. 1.

Also shown in FIG. 1 is a rectangular sleeve 21, open at front and back, and preferably formed from a somewhat flexible material such as light plastic, cardboard, or heavy paper. Flexibility of the sleeve 21 helps in fitting it rather closely over a storage unit 12 containing a packet of slides 19, as shown in FIG. 3. The use of the sleeve 21 is optional, but it helps form a unitary package with the slides and the storage unit 12, maintaining the integrity of the group of slides when it is removed from the tray member 11. The sleeve 21 also helps protect the group of slides against the intrusion of dust, although it is open at front and back, leaving one face of each of the end slides exposed. In addition, the outer surfaces of the sleeve 21 may be used for placing a written notation of the contents of the slides in the particular unit. The unit 12 with slides and the covering sleeve 21 will fit between the walls of the tray member 11. Also, the length of the sleeve is the same as or slightly less than that of the unit 12, so that the combined package shown in FIG. 3 takes up no more space in the tray member than would the unit 12 and slides alone.

FIGS. 1, 5 and 6 illustrate a cover box 22 which can be provided for each tray member 11 and its contents. The elongated box 22 has one open end and receives the tray member 11 in drawer-like fashion as shown in FIG. 1. Its side walls 23 may be notched out at the lower interior as shown particularly in FIGS. 1 and 5, to form a channel for the tray member 11. An end cover 24 may be provided to fit over and close the open end when a tray of slides is contained therein. In addition to serving as a dust cover and protector against damage to the slides, the cover box 22 provides a compact storage unit which may be fitted conveniently into almost any space in a drawer, on shelves, in a cabinet, etc. The box 22 may be stored horizontally or vertically, and other items may be stacked on top.

As shown in FIG. 6, a number of cover boxes 22 may be stacked together continuously, either side by side or vertically stacked or in a honeycomb-like cluster, as illustrated. The boxes can even be integrally formed, with common walls dividing them as a larger storage unit for a large number of trays of slides (not shown). When they are stacked together contiguously, the boxes should have a different type end cover which does not extend laterally beyond the bounds of the box on which it is to be received. Such an end cover 25 may be as shown in FIG. 6, with flanges 26 designed to fit snugly within the interior of the box end opening to hold the cover in place. The box 22 should be slightly longer than the tray member 11 to accommodate the holding flanges 26. As an alternative to the cover 25, the tray member itself may have a large, flat wall at one end (not shown), instead of the short flange 14, to fit snugly within the opening at the end of the box.

The above described preferred embodiment provides a slide storage system which is relatively simple in construction yet highly efficient and versatile in use as well as in its ability to be increased in capacity and stored almost anywhere. Various other embodiments and changes to this preferred embodiment will be apparent to those skilled in the art and may be made without departing from the spirit and scope of the following claims.

I claim:

1. Apparatus for storing slides, comprising:
   an elongated tray member having a bottom and having two sides lower than the height of a slide;
   a series of U-shaped slide storage units arranged in end-to-end succession in the tray member;
   each U-shaped unit having a bottom and front and back end walls, open at sides and top, the distance between the top of one wall and the juncture of the other wall and the unit bottom being less than the height of a slide, so that the top of a single slide in the unit will not fall below the top of a wall; and
   each U-shaped unit being sized to receive a cluster of vertically oriented slides facing the front and back end walls of the unit, and each unit being individually removable from the tray member without movement of the remaining units in the tray member.

2. The slide storing apparatus of claim 1 which further includes rectangular covering sleeves, open at front and back, positioned around at least some of the slide storage units containing slides, with the storage unit, the contained slides, and the covering sleeve being positioned in the tray member and oriented with the open front and back of the sleeve facing forward and rear in the tray member.

3. The slide storing apparatus of claim 1 which further includes an elongated rectangular storage box open at one end and sized to receive the tray member and contained sides in drawer-like fashion, with a removable cover for the open end.

4. The slide storing apparatus of claim 3, including a plurality of tray members and storage boxes, the boxes being positioned contiguously with the open ends facing in one direction.

5. The slide storing apparatus of claim 3 which further includes rectangular covering sleeves, open at front and back, positioned around at least some of the slide storage units containing slides, with the storage unit, the contained slides, and the covering sleeve being positioned in the tray member and oriented with the open front and back of the sleeve facing forward and rear in the tray member.

* * * * *